(12) United States Patent
Romanova et al.

(10) Patent No.: US 7,407,544 B2
(45) Date of Patent: Aug. 5, 2008

(54) POLYMERIC DISPERSANTS BASED ON ADDITION OF AMINES TO DIALKYLSUCCINYL SUCCINATE OR ITS DERIVATIVES

(75) Inventors: Tatiana N. Romanova, Loveland, OH (US); Ed Sung, Cincinnati, OH (US); Russell J. Schwartz, Montgomery, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/581,481

(22) Filed: Oct. 17, 2006

(65) Prior Publication Data

US 2008/0087193 A1  Apr. 17, 2008

(51) Int. Cl.
*C09B 67/20* (2006.01)
*C09D 5/00* (2006.01)
*C09D 11/00* (2006.01)
*C08G 73/00* (2006.01)

(52) U.S. Cl. .................. 106/493; 106/31.75; 106/31.76; 106/499; 523/160; 528/288; 528/289; 528/340; 528/346; 528/347

(58) Field of Classification Search ............... 106/31.75, 106/31.76, 493, 499; 523/160; 528/288, 528/289, 340, 346, 347
See application file for complete search history.

(56) References Cited

U.S. PATENT DOCUMENTS

| 4,496,686 A | 1/1985 | Ansel |
| 4,673,705 A | 6/1987 | Ansel et al. |
| 4,754,056 A | 6/1988 | Ansel et al. |
| 5,034,444 A | 7/1991 | Yun et al. |
| 5,424,364 A | 6/1995 | Simms et al. |
| 5,491,255 A * | 2/1996 | Schwarz et al. ............. 560/126 |
| 6,037,414 A | 3/2000 | Simms et al. |
| 6,451,950 B1 | 9/2002 | Ma |
| 6,495,618 B1 | 12/2002 | Ma |
| 6,878,799 B2 | 4/2005 | He |
| 2002/0102485 A1 | 8/2002 | Abe et al. |
| 2005/0124727 A1* | 6/2005 | Huber et al. ................. 523/160 |

FOREIGN PATENT DOCUMENTS

| DE | 2 152 284 | 4/1972 |
| EP | 0 763 378 A2 | 3/1997 |
| JP | 10-298476 | 11/1998 |
| JP | 2002-69323 | 3/2002 |

OTHER PUBLICATIONS

Wu et al., Organic Letters, vol. 6, pp. 229-232 (2004) [no month].
Moore et al., Macromolecules, vol. 8, pp. 121-127 (1975) [no month].

* cited by examiner

*Primary Examiner*—Anthony J Green
(74) *Attorney, Agent, or Firm*—Dickstein Shapiro LLP

(57) ABSTRACT

Dispersants for pigments as well as dispersions of pigments containing them, and compositions such as inks and coatings containing them are described. The dispersants are the reaction product of a dialkylsuccinyl succinate and an amine.

32 Claims, 4 Drawing Sheets

POLYMERIC DISPERSANTS BASED ON ADDITION OF AMINES TO DIALKYLSUCCINYL SUCCINATE OR ITS DERIVATIVES

BACKGROUND OF THE INVENTION

This invention relates to pigment dispersants, which are easy to prepare and are useful for dispersing a wide variety of pigments.

Pigments are frequently dispersed as fine particles into a liquid medium for use in inks and coatings, as well as plastics, cosmetics, adhesives, and the like. For that purpose, it is desirable for the pigment to be dispersed as finely and as rapidly as possible into the liquid medium and remain as a stable fine dispersion over time for optimum results. Unfortunately, the dispersion of fine particles in liquids is unstable, i.e., the particles tend to agglomerate or flocculate causing uneven pigmentation in the product being colored.

Numerous pigment dispersants have been developed in order to minimize the effects of agglomeration and/or flocculation. They have been used to form pigment dispersions that are used in a variety of water borne and solvent borne coating compositions. Examples of U.S. Patents describing dispersants and pigment dispersants include U.S. Pat. Nos. 4,496,686, 4,673,705, 4,754,056, 5,034,444, 5,424,364, 6,037,414, 6,451,950, 6,495,618, and 6,878,799.

The dispersants act to lower the viscosity of pigment dispersions, which makes it possible for more pigment to be employed, thereby affording very concentrated dispersions which can be satisfactorily handled and dispersed. However, although the pigment concentration increases linearly, the viscosity of the dispersion increases exponentially and the upper limit of pigment concentration in the dispersion is determined by the viscosity. When the viscosity becomes too high, a pigment can no longer be dispersed satisfactorily or easily handled during ink or coating manufacturing. In addition, the system experiences a heat buildup due to the frictional forces that occur during the dispersion process. This can be detrimental to quality because the increase in temperature can cause degradation of certain pigments. Incorporation of the appropriate dispersant also helps to neutralize such defects by providing a more efficient wetting and deflocculating of the pigment, and affording a more stable dispersion.

The present invention provides new pigment dispersants.

SUMMARY OF THE INVENTION

The present invention relates to dispersants for pigments and to dispersions of pigments containing them, as well as compositions such as inks and coatings containing them. The new dispersants provide improved viscosity for the pigment dispersions which can be solvent based, oil based, water based, energy curable or a combination of such systems. Inks and coatings containing the surface modified pigments or the dispersions are also provided.

The dispersants of the present invention are the reaction product of a dialkylsuccinyl succinate with one or more amines, when at least one amine is polymeric, with or without further modification such as oxidation, cyclization, salt formation, or functional group modification.

Figure 1:
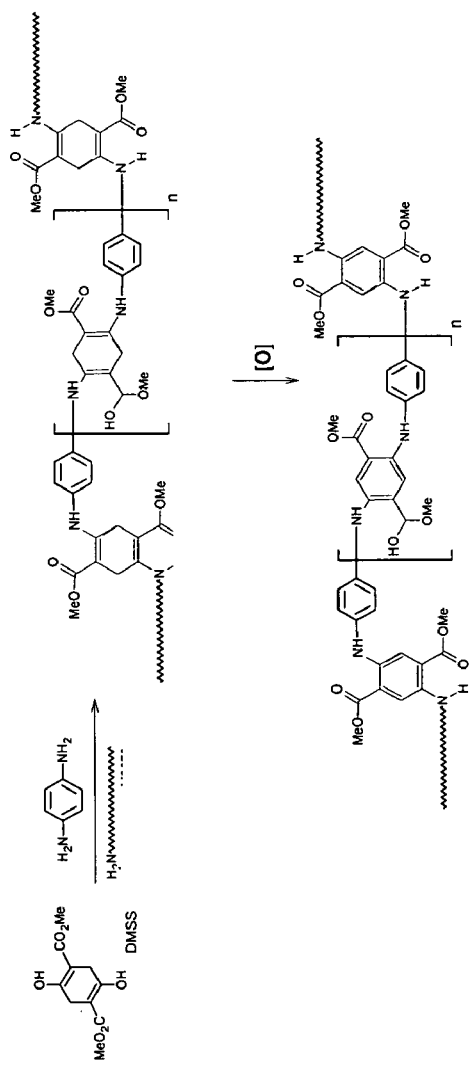
FIG. 1 shows the reaction scheme of Example 1.
Figure 2:
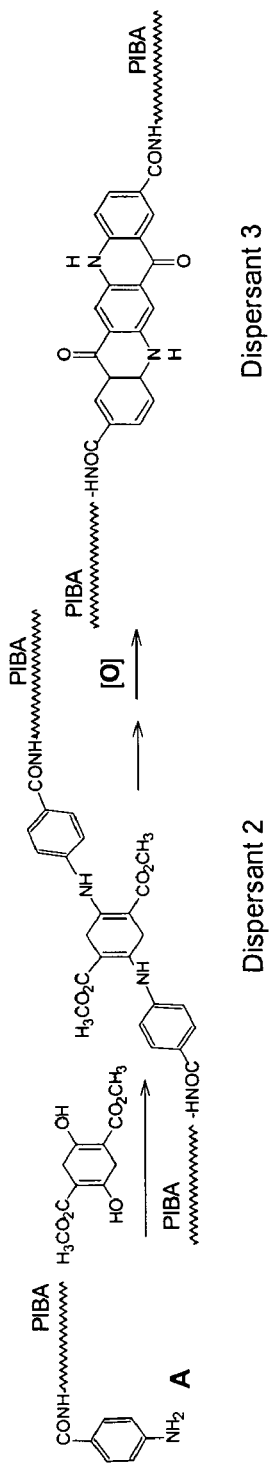
FIG. 2 shows the reaction scheme of Example 3.
Figure 3:
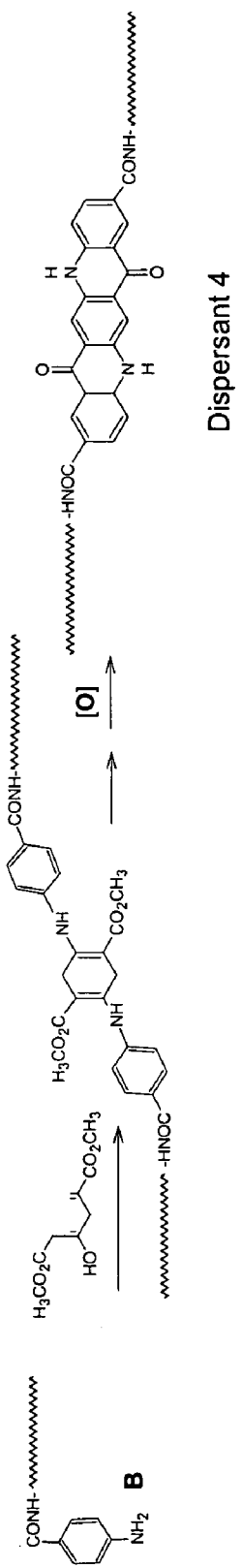
FIG. 3 shows the reaction scheme of Example 5.
Figure 4:
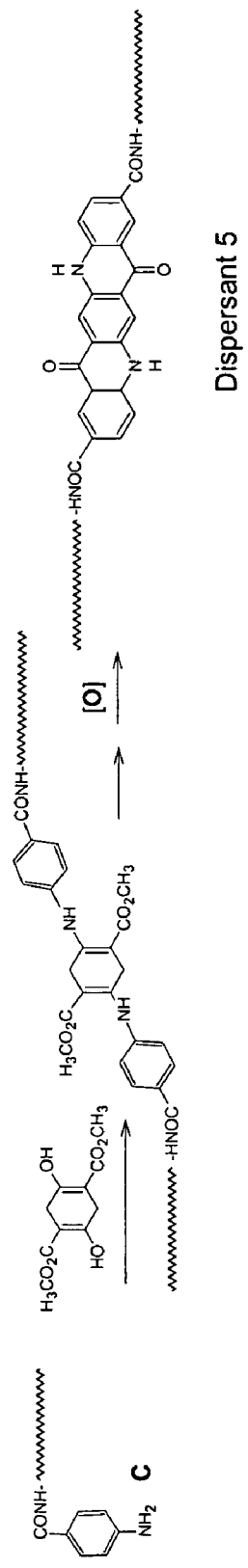
FIG. 4 shows the reaction scheme of Example 8.
Figure 5:
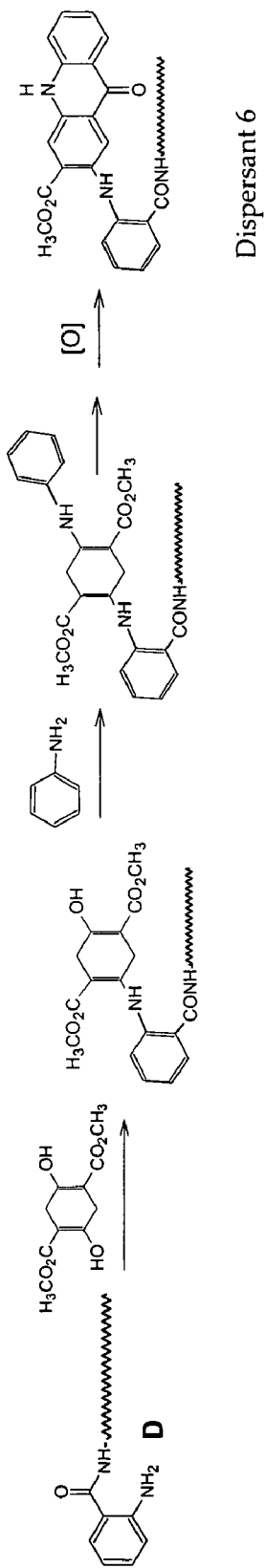
FIG. 5 shows the reaction scheme of Example 10.
Figure 6:
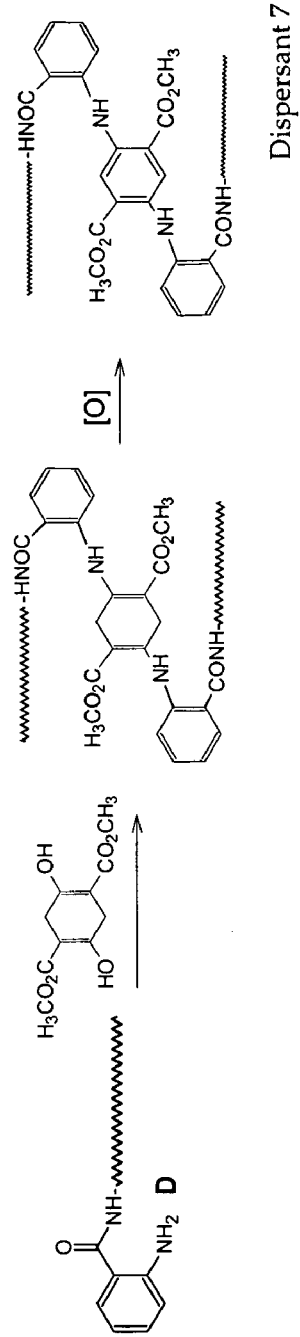
FIG. 6 shows the reaction scheme of Example 12.
Figure 7:
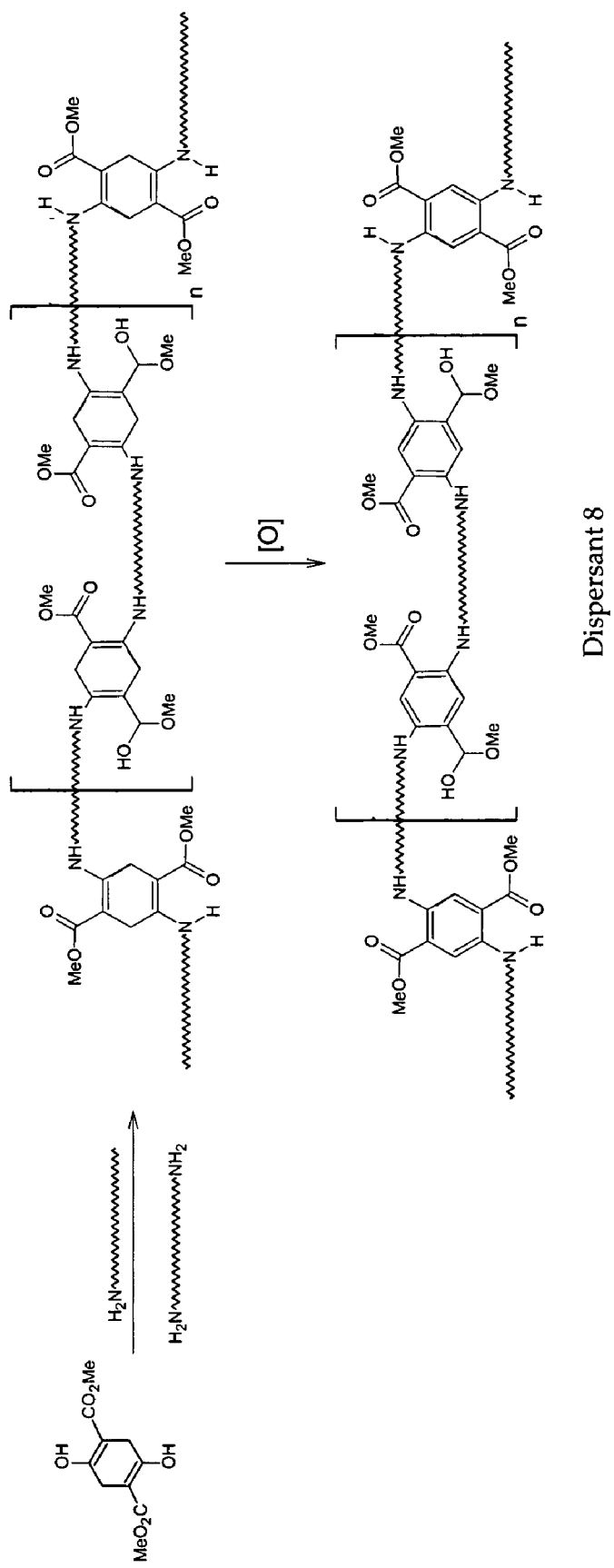
FIG. 7 shows the reaction scheme of Example 14.

In all of the drawings as well as in the text below, the wavy line is intended to indicate the polymeric nature of the moiety and not to indicate a specific number of carbon atoms.

DESCRIPTION OF THE INVENTION

In accordance with the present invention, new pigment dispersants, surface modified pigments or pigment dispersions, and compositions such as inks and coatings containing them are provided.

The novel pigment dispersants of the present invention are particularly effective for the dispersion of both inorganic pigments and organic pigments. Any known pigments can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, diketopyrrolopyrroles, phthalocyanines, perylenes, azo pigments, and indanthrones dioxazines such as carbazole violet, isoindolinones, isoindolons, thioindigio reds, and benzimidazolones and metallic flakes such as aluminum flake, mica pigments, and the like.

The pigments suitable for use in the present invention thus include International Colour Index or C.I. Pigment Black 1, C.I Pigment Black 31, C.I. Pigment Black 11, C.I. Pigment Black 7, C.I Pigment Black 250, C.I. Pigment Blue 61, C.I. Pigment Blue 62, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 29, C.I. Pigment Blue 27, C.I. Pigment Green 17, C.I. Pigment Green 18, C.I. Pigment Green 7, C.I. Pigment Green 36, C.I. Pigment Orange 5, C.I. Pigment Orange 13, C.I. Pigment Orange 16, C.I. Pigment Orange 34, C.I. Pigment Orange 36, C.I. Pigment Violet 3, C.I. Pigment Violet 27, C.I. Pigment Violet 23, C.I. Pigment Violet 19, C.I. Pigment Red 122, C.I. Pigment Red 202, C.I. Pigment Red 206, C.I. Pigment Red 207, Pigment Red 254, C.I. Pigment Red 22, C.I. Pigment Red 23, C.I. Pigment Red 17, C.I. Pigment Red 210, C.I. Pigment Red 170, C.I. Pigment Red 188, C.I. Pigment Red 185, C.I. Pigment Red 146, C.I. Pigment Red 144, C.I. Pigment Red 101, C.I. Pigment Red 176, C.I. Pigment Red 48:1, C.I. Pigment Red 48:2, C.I. Pigment Red 57:1, C.I. Pigment Red 81:1, C.I. Pigment Red 81:2, C.I. Pigment Red 81:3, C.I. Pigment Red 81:5, C.I. Pigment Red 179, C.I. Pigment Red 3, C.I. Pigment Red 249, C.I. Pigment Red 114, C.I. Pigment Red 181, C.I. Pigment Yellow 1, C.I. Pigment Yellow 2, C.I. Pigment Yellow 3, C.I. Pigment Yellow 147, C.I. Pigment Yellow 142, C.I. Pigment Yellow 42, C.I. Pigment Yellow 151, C.I. Pigment Yellow 154, C.I. Pigment Yellow 180, C.I. Pigment Yellow 138, C.I. Pigment Yellow 139, C.I. Pigment Yellow 93, C.I. Pigment Yellow 109, C.I. Pigment Yellow 110, C.I. Pigment Yellow 14, C.I. Pigment Yellow 12, C.I. Pigment Yellow 17, C.I. Pigment Yellow 13, C.I. Pigment Yellow 74, C.I. Pigment Yellow 73, C.I. Pigment Yellow 75, C.I. Pigment Yellow 83, C.I. Pigment Yellow 65, C.I. Pigments Yellow 128, D&C Red No. 7, D&C Red No. 6 and D&C Red No. 34. Other pigment examples include carbon black pigments such as Regal 330 (available from Cabot Corporation); quinacridone pigments such as Quinacridone Magenta (228-0122) (available from Sun Chemical Corporation); diarylide yellow pigments such as AAOT Yellow (274-1788) (available from Sun Chemical Corporation); and phthalocyanine blue pigments such as Blue 15:3 (294-1298) (available from Sun Chemical Corporation). Usable pigments are not limited to the foregoing.

The dispersants of the present invention are the reaction product of a dialkylsuccinyl succinate, i.e., dialkyl-2,5-di-oxo-1,4-cyclohexanedicarboxylate, with one or more amines, mono or di, when at least one amine is polymeric. The alkyl groups of the succinate can have 1 to about 18 carbon atoms, and preferably are lower alkyl of 1 to 4 carbon atoms, and most preferably are methyl. The alkyl groups can be straight chained or branched.

The amines generally conform to the formula $R-(NH_2)_n$ in which n is 1 or 2, and R is straight, branched or cyclic, saturated or unsaturated group such as alkyl, alkenyl, alkynyl or aryl group or alkaryl or heteroaryl or heterocyclic or carbonyl, ether or ester or ketone or amide or urea or urethane group or combinations thereof, provided that at least one amine is polymeric in that it has a number average molecular weight of at least about 200, preferably at least about 1000.

Polymeric amines are those containing a polymeric group comprising repeating monomer units or multiple monomer units, or both, where the monomer can be any type of monomer. The polymeric amine can contain any type of polymeric group, such as homopolymer, copolymer, terpolymer, and/or contain any number of different repeating units and can be a random polymer, alternating polymer, graft polymer, block polymer, and/or comb-like polymer.

In general, any alkyl moiety in a R group has 1 to about 30 carbon atoms, preferably about 1 to 6 carbon atoms, and any cyclic moiety contains about 4 to about 8 carbon atoms, preferably about 5 to 6 carbon atoms.

The R group can be unsubstituted or substituted by, for instance, with one or more functional groups. Examples of functional groups include, but are not limited to hydroxide, carboxyl, halogen, CN, primary, secondary or tertiary amino, thiol, sulfonate, sulfates, phosphate, phosphonate, and the like. In one preferred embodiment, the R group is or contains a poly(alkylene oxide) moiety, in another preferred embodiment, the R group contains a polyalkylene moiety. In another preferred embodiment, the R group contains a benzamido moiety. In yet another preferred embodiment, the amido nitrogen of the benzamide moiety is linked to either a poly(alkylene oxide) moiety or another group which makes the R group polymeric.

Examples of useful amines include, but are not limited to, $NH_3$, methylamine, ethylamine, n-propylamine, n-butylamine, n-hexylamine, hydroxyethylamine, hydroxylamine, hydrazine, dimethylaminoethylamine, diethylaminoethylamine, 2-ethylhexylaminoethylamine, stearylaminoethylamine, oleylaminoethylamine, dimethylaminopropylamine, dibutylaminopropylamine, diethylaminobutylamine, dimethylaminoamylamine, diethylaminohexylamine, piperidinomethylamine, piperidinoethylamine, piperidinopropylamine, pipecolinoethylamine, pipecolinopropylamine, imidazolopropylamine, morpholinoethylamine, morpholinopropylamine, 1,2-cyclopentanediamine, 1,2-cyclohexanediamine, aniline, o-phenylenediamine, 2,3- or 1,8-diaminonaphthalene, 2,3- or 3,4-diaminopyridine, 9,10-diaminophenanthrene, N,N-dimethyl-1,4-phenylenediamine and the like.

In the preferred poly(alkylene oxide)-containing amines, each alkylene oxide group contains 1 to about 4 carbon atoms, and preferably about 2 to 3 carbon atoms. The commercially available poly(alkylene oxide) amines generally contain a polyether backbone that is based either on propylene oxide, ethylene oxide or mixed propylene oxide and ethylene oxide. The poly(alkylene oxide) monoamines are prepared by reaction of a monohydric alcohol, followed by conversion of the resulting terminal hydroxyl group to an amine. The poly(alkylene oxide) diamines are commercially available as several types, e.g. diamine-terminated polypropylene glycols, polyether diamines based on a predominantly polyethylene oxide backbone as well as urea condensates of such polyether diamines.

The preferred polymeric reagent can also be a polyalkyleneamine or aminobenzamide of the general structure:

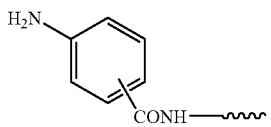

or other functionally modified polymeric amines.

More than one different high molecular weight amines can be employed if desired.

When a difunctional reactant is employed, it can link two dialkylsuccinyl succinate compounds together, thereby forming a polymeric dispersant.

The succinate-amine reaction is effected at a temperature of about 20° to 180° C., preferably at about 100 to 130° C. When two or more amines are used, the reaction can be conducted stepwise. If desired, the reaction can be allowed to continue for a sufficiently long time or sufficiently high temperature for further modification such as oxidation, cyclization, or functional group modification. No solvent is required.

The dispersant of the present invention will generally conform to the formula

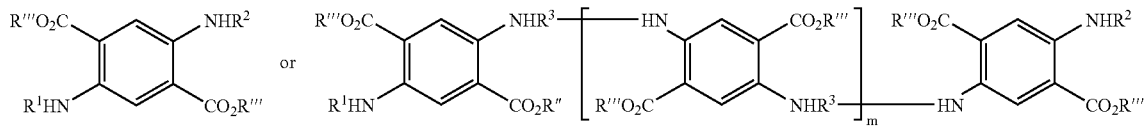

or an isomer thereof, or a mixture of them.

In the above formulae, m can be 1 to 10, and $R'''$ corresponds to the alkyl moieties of the succinate, $R^1$, $R^2$ & $R^3$ can be the same or different and each corresponds to a straight, branched or cyclic, saturated or unsaturated group such as alkyl, alkenyl, alkynyl or aryl group or alkaryl or heteroaryl or heterocyclic or ether or ester or ketone or amide or urea or urethane group or combinations thereof, provided that at least one of these R groups is polymeric, as described above.

In general, any alkyl moiety in a R group has 1 to about 30 carbon atoms, preferably about 1 to 6 carbon atoms, and any cyclic moiety contains about 4 to about 8 carbon atoms, preferably about 5 to 6 carbon atoms.

The R group can be unsubstituted or substituted by, for instance, one or more functional groups. Examples of functional groups include, but are not limited to hydroxide, carboxyl, halogen, CN, primary, secondary or tertiary amino, thiol, sulfonate, sulfates, phosphate, phosphonate, and the like. In one preferred embodiment, the R group is or contains a poly(alkylene oxide) moiety, in another preferred embodiment, the R group contains a polyalkylene moiety. In another preferred embodiment, the R group contains a benzamido moiety. In yet another preferred embodiment, the amido nitrogen of the benzamide moiety is linked to either a poly (alkylene oxide) moiety or another group which makes the R group polymeric.

When aniline or its derivatives of the general formula

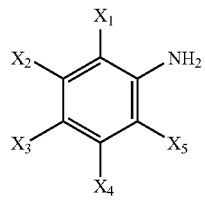

is used as the reagent, the product of the reaction with dialkyl-succinyl succinate can be further oxidized and cyclized forming dispersants of the formula

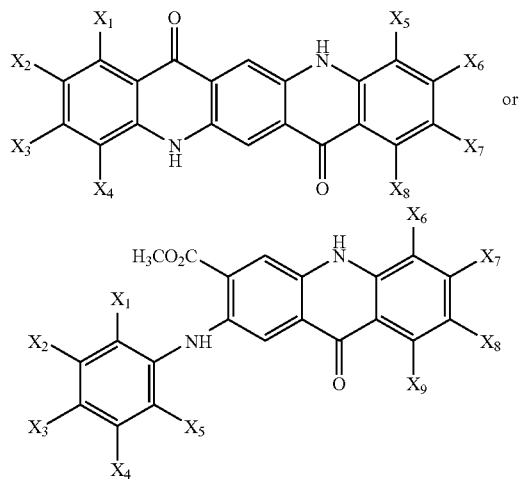

In the above formulae, X may be H, a functional group or a functional group linked to a polymer. $X_1$, $X_2$, $X_3$, $X_4$, $X_5$, $X_6$, $X_7$, $X_8$ and $X_9$ can be the same or different.

Examples of functional groups include, but are not limited to R', OR', COR', COOR', OCOR', carboxylates, halogens, CN, NR'$_2$, SO$_3$H, sulfonates, sulfates, NR'(COR''), CONR', PO$_3$H$_2$, phosphonates, N=NR', SOR', NSO$_2$R', wherein R' and R'' can be the same or different, is independently hydrogen, branched or unbranched $C_1$-$C_{30}$ substituted or unsubstituted, saturated or unsaturated hydrocarbons, e.g., alkyl, alkenyl, alkynyl, substituted or unsubstituted aryl, substituted or unsubstituted heteroarylaryl, substituted or unsubstituted alkaryl, substituted or unsubstituted arylkyl or polymeric.

Also, any functional group of the dispersant may be modified to form a dispersant with modified functional group. For example, the dispersant may be converted into salt form. The anion may be inorganic, such as halide, sulfate, phosphate, and the like, or organic, such as acetate, and the like.

To form a surface treated pigments an individual pigment or a mixture of pigments is preferably predispersed with one or more dispersants of this invention in the customary solvent or solvent blend using conventional techniques such as high speed mixing, ball milling, sand grinding, attritor guiding, or two or three roll milling with further removal of solvent.

To form a pigment dispersion or a millbase, an individual pigment or a mixture of pigments, which have or have not been surface treated, is combined with one or more dispersants of this invention in the customary organic solvent or solvent blend and dispersed using conventional techniques such as high speed mixing, ball milling, sand grinding, attritor guiding, or two or three roll milling. The pigment dispersion can also be made by grinding or milling the dry pigments with the dispersants of the present invention or by mixing the pigments with the dispersant in a liquid medium in a pigment flushing process. The resulting pigment dispersion, whether as a millbase or ink/coating will have a pigment to dispersant weight ratio of about 0.1/100 to 50/100, more preferably about 1/100 to 30/100, and most preferably about 5/100 to 20/100.

It may be desirable to add other optical ingredients to the pigment dispersion such as antioxidants, flow control agents, UV stabilizers, light quenchers and absorbers, and rheology control agents such as fumed silica and microgels. Film forming polymers such as acrylics, acrylourethanes, polyester urethanes, polyesters, alkyds, polyethers and the like, can also be employed.

The dispersant composition may comprise a thermoset or a thermoplastic resin, crosslinking agents, flow leveling agents, wetting agents, thickeners, anti-settling agents, UV stabilizers and other additives to enhance the end use performance. The dispersants in this invention may be used together with other dispersion aids, such as a grinding resin or an additive to achieve synergistic effects.

Additives may be used in combination with the dispersant and pigment of the present invention. For instance, ammonia or some other suitably functional amine may be used to adjust the pH of the dispersion. Biocides, such as Proxel GMX (available from Rohm & Haas, Philadelphia, Pa.) can be used to aid in the inhibition of bacterial growth. Glycols may be used to modify the properties of the dispersion and improve jettability in the case of an ink jet ink, and would preferably include propylene glycol, polyethylene glycol (such as PEG 200) 400 and 1000, available from Union Carbide, Danbury, Conn.). Defoamers, co-solvents and surface active agents, such as octylphenolethoxylates or acetylenics, may be used to modify surface tension. However, the amount of additive should be held to a minimum. For example, a glycol should represent no more than 20 wt. % of the composition; a biocide no more than 0.5 wt. %; a defoamer no more than 1.5 wt. %; and a co-solvent no more than 30 wt. %.

The polymeric dispersant as such or as a millbase or as surface modified pigment is added to the ink or coating application system which may be a solvent based, oil based, water based, energy curable system (ultra-violet, electron beam or cationic) or combination of those systems. A pigment and dispersant, surface modified pigment or a preformed pigment dispersion can thus be added to a variety of aqueous or solvent borne inks or coatings. These compositions may contain film-forming polymers such as hydroxy functional acrylic and polyester resins and crosslinking agents such as blocked isocyanates, alkylated melamines, polyisocyanates, epoxy resins, and the like. Such inks and coatings can contain any known additive(s).

When formulated into an ink or coating, the pigment is generally about 0.1% up to about 70% of the composition, preferably about 1% up to about 20%, and most preferably up to about 10%. The dispersant(s) will generally constitute about 0.1 to 20%, preferably less than 10% and more preferably less than 5% of the composition.

In order to further illustrate the invention, various examples are set forth below. In these, as throughout the specification and claims, all parts and percentages are by weight and all temperatures in degrees Centigrade unless otherwise indicated.

EXAMPLE 1

A reaction mixture containing 1800 g of a primary amine-terminated poly(ethylene oxide/propylene oxide) copolymer having a number average molecular weight of about 2000, 482.7 g of dimethylsuccinyl succinate (dimethyl 2,5-dioxo-1,4-cyclohexanedicarboxylate from Sun Chemical) and 2.7 g of HCl (36.5-38% from VWR) was heated to 120° C. under nitrogen and the reaction continued for 2 hours. Then, 146 g of p-phenylenediamine (from Aldrich) was added to the reaction mixture and the reaction continued for 15 hours, at which time the reaction mixture was heated to 180° C. for an additional 3 hours. The product (Dispersant 1) was dark red viscous polymer.

EXAMPLE 2

Water borne dispersions were formed by mixing the following pigments with Dispersant 1 were mixed for 30 minutes with sand as a grinding media: DPP Red BO (from CIBA); Red 202 (Code #228-6843 from Sun Chemical); Red 179 (Code #229-6438 from Sun Chemical); 15:1 (Code #248-4816 from Sun Chemical); Carbon Black 250 (from Degussa). The viscosity of final dispersion was measured by Brookfield DV-I+ Viscometer (spindle #4 at 60 rpm). If the viscosity was greater than 10,000 cps, it was designated "very thick." Identical formulations omitting the dispersant and increasing the water content to compensate were used as controls.

|  | % | Amount, g | Initial Viscosity |
|---|---|---|---|
| Formula 1: |  |  |  |
| Pigment DPP | 45.6 | 23.71 |  |
| Dispersant 1 | 2.63 | 1.37 |  |
| Water | 51.77 | 26.92 |  |
| Total | 100% | 52 g | 80 cps |
| Sand media |  | 40 g |  |
| Control 1: |  |  |  |
| Pigment DPP | 45.6 | 23.71 |  |
| Water | 54.4 | 28.29 |  |
| Total | 100% | 52 g | Very thick |
| Sand media |  | 40 g |  |
| Formula 2: |  |  |  |
| Pigment Red 202 | 30 | 15.6 |  |
| Dispersant 1 | 8.0 | 4.16 |  |
| Water | 62.0 | 32.24 |  |
| Total | 100% | 52 g | 260 cps |
| Sand media |  | 40 g |  |
| Control 2: |  |  |  |
| Pigment Red 202 | 30 | 15.6 |  |
| Water | 70 | 36.4 |  |
| Total | 100% | 52 g | Very thick |
| Sand media |  | 40 g |  |
| Formula 3: |  |  |  |
| Pigment Red 179 | 30 | 15.6 |  |
| Dispersant 1 | 8.0 | 4.16 |  |
| Water | 62.0 | 32.24 |  |
| Total | 100% | 52 g | 60 cps |
| Sand media |  | 40 g |  |
| Control 3: |  |  |  |
| Pigment Red 179 | 30 | 15.6 |  |
| Water | 70 | 36.4 |  |
| Total | 100% | 52 g | Very thick |
| Sand media |  | 40 g |  |
| Formula 4: |  |  |  |
| Pigment Blue 15:1 | 33 | 17.16 |  |
| Dispersant 1 | 7.0 | 3.64 |  |
| Water | 60.0 | 31.2 |  |
| Total | 100% | 52 g | 30 cps |
| Sand media |  | 40 g |  |
| Control 4: |  |  |  |
| Pigment Blue 15:1 | 33 | 17.16 |  |
| Water | 67 | 34.84 |  |
| Total | 100% | 52 g | Very thick |
| Sand media |  | 40 g |  |
| Formula 5: |  |  |  |
| Pigment Black 250 | 40 | 20.8 |  |
| Dispersant 1 | 7.0 | 3.64 |  |
| Water | 53.0 | 27.56 |  |
| Total | 100% | 52 g | 310 cps |
| Sand media |  | 40 g |  |
| Control 5: |  |  |  |
| Pigment Black 250 | 40 | 20.8 |  |
| Water | 60 | 31.2 |  |
| Total | 100% | 52 g | Very thick |
| Sand media |  | 40 g |  |

EXAMPLE 3

A reaction mixture containing 50.4 g of polyisobutylene 4-aminobenzamide A having a number average molecular weight of about 1680 made from Kerocom PIBA-03 (from BASF), 4.02 g of dimethylsuccinyl succinate (from Sun Chemical) and 0.1 g of HCl (36.5-38% from VWR) was heated to 120° C. under nitrogen and maintained at that temperature for 2 hours to form Dispersant 2 (orange liquid). Dispersant 3, a dark red viscous liquid, was formed after heating Dispersant 2 to 200° C. for 1 hour.

EXAMPLE 4

Oil based dispersions were formed by mixing Dispersant 2 or 3 (32.4% and 64.4% active content in n-Paraffins, $C_{8-20}$) with Pigment Red 202 (Code #228-6843 from Sun Chemical) and Magiesol 47 oil (from Magie Bros.) for 4 minutes with sand as a grinding media. The viscosity (flow) of the final dispersion was measured by flow plate technique. An identical formulations omitting the dispersant and increasing the oil content to compensate were used as a control.

|  | % | Amount, g | Flow, cm/sec |
|---|---|---|---|
| Formula 6: | | | |
| Pigment Red 202 | 33.3 | 1.75 | |
| Dispersant 2 | 7.6 | 0.4 | |
| 47 oil | 59.1 | 3.1 | |
| Total | 100% | 5.25 g | 16.5 cm/28 sec |
| Sand media | | 5 g | |
| Formula 7: | | | |
| Pigment Red 202 | 33.3 | 1.75 | |
| Dispersant 3 | 6.9 | 0.36 | |
| 47 oil | 59.8 | 3.14 | |
| Total | 100% | 5.25 g | 19 cm/28 sec |
| Sand media | | 5 g | |
| Control 6: | | | |
| Pigment Red 202 | 33.3 | 1.75 | |
| 47 oil | 66.7 | 3.5 | |
| Total | 100% | 5.25 g | No flow |
| Sand media | | 5 g | |

EXAMPLE 5

A reaction mixture of 146.3 g of poly(propyleneoxide/ethyleneoxide) 4-aminobenzamide B having a number average molecular weight of about 2120, made from a primary amine-terminated polyoxyethylene/propylene copolymer having a number average molecular weight of about 2000), 10.43 g of dimethylsuccinyl succinate (from Sun Chemical) and 0.2 g of HCl (36.5-38% from VWR) was heated to 120° C. under nitrogen and maintained at the temperature for one hour. The reaction mixture was then heated to 200° C. and vacuum applied. The reaction was continued under vacuum and nitrogen at 200-210° C. for 5 hours to yield Dispersant 4, a red viscous polymer.

EXAMPLE 6

A solvent borne dispersion containing Dispersant 4, Pigment Red 179 (Code #229-6438 from Sun Chemical) and n-butyl propionate (from Aldrich) was prepared by mixing for 10 minutes using sand as a grinding media. The viscosity of final dispersion was measured by flow plate technique. An identical formulations omitting the dispersant and increasing the ester content to compensate were used as controls.

|  | % | Amount, g | Flow, cm/sec |
|---|---|---|---|
| Formula 8: | | | |
| Pigment Red 179 | 40.0 | 2.0 | |
| Dispersant 4 | 6.0 | 0.3 | |
| n-Butyl Propionate | 54.0 | 2.7 | |
| Total | 100% | 5 g | 15.5 cm/1 min |
| Sand media | | 5 g | |
| Control 8: | | | |
| Pigment Red 179 | 40.0 | 2.0 | |
| n-Butyl Propionate | 60.0 | 3.0 | |
| Total | 100% | 5 g | No flow |
| Sand media | | 5 g | |

EXAMPLE 7

A UV Flexo dispersion was made by mixing Pigment Red 179 (Code #229-6438 from Sun Chemical); oligomer CN2102E and monomer SR306 (from Sartomer) with Dispersant 4 for 5 minutes with sand as a grinding media. The viscosity of the final dispersion was measured by flow plate technique. An identical formulation omitting the dispersant and increasing the oligomer and monomer content to compensate were used as a control.

|  | % | Amount, g | Flow, cm/sec |
|---|---|---|---|
| Formula 9: | | | |
| Pigment R179 | 30.0 | 1.5 | |
| Dispersant 4 | 8.0 | 0.4 | |
| Oligomer CN2102E | 31.0 | 1.55 | |
| Monomer SR306 | 31.0 | 1.55 | |
| Total | 100% | 5.0 g | 8.5 cm/40 sec |
| Sand media | | 5.0 g | |
| Control 9: | | | |
| Pigment R179 | 30.0 | 1.5 | |
| Oligomer CN2102E | 35.0 | 1.75 | |
| Monomer SR306 | 35.0 | 1.75 | |
| Total | 100% | 5.0 g | No flow |
| Sand media | | 5.0 g | |

EXAMPLE 8

A mixture of 522 g of poly(propyleneoxide/ethyleneoxide) 4-aminobenzamide C having a number average molecular weight of about 2120 (made from a primary amine-terminated poly(ethylene oxide/propylene oxide) copolymer having a number average molecular weight of about 2000), 33.52 g of dimethylsuccinyl succinate (from Sun Chemical) and 0.7 g of HCl (36.5-38% from VWR) was heated to 120° C. under nitrogen, held at that temperature for 1 hour, and then heated to 200° C. and vacuum applied. The reaction was continued under vacuum and nitrogen at 200-210° C. for 3 hours. The resulting Dispersant 5 was a dark red viscous polymer.

EXAMPLE 9

Water borne dispersion was prepared using pigments DPP Red BO (from CIBA), Red 202 (Code #228-6843 from Sun Chemical) or Red 179 (Code #229-6438 from Sun Chemical). All samples were mixed for 30 minutes with sand as a grinding media. The viscosity of final dispersion was measured by Brookfield DV-I+ Viscometer (with spindle #4 at 60 rpm). Identical formulations omitting the dispersant and increasing the water content to compensate were used as controls.

|  | % | Amount, g | Initial Viscosity |
|---|---|---|---|
| Formula 10: | | | |
| Pigment DPP | 40.0 | 20.8 | |
| Dispersant 5 | 2.5 | 1.3 | |
| Water | 57.5 | 29.9 | |
| Total | 100% | 52 g | 320 cps |
| Sand media | | 40 g | |

-continued

| | % | Amount, g | Initial Viscosity |
|---|---|---|---|
| Control 10: | | | |
| Pigment DPP | 40.0 | 20.8 | |
| Water | 60 | 31.2 | |
| Total | 100% | 52 g | Very thick |
| Sand media | | 40 g | |
| Formula 11: | | | |
| Pigment Red 202 | 33.0 | 8.6 | |
| Dispersant 5 | 7.0 | 1.8 | |
| Water | 60.0 | 15.6 | |
| Total | 100% | 26 g | 40 cps |
| Sand media | | 20 g | |
| Control 11: | | | |
| Pigment Red 202 | 33.0 | 8.6 | |
| Water | 67.0 | 17.4 | |
| Total | 100% | 26 g | Very thick |
| Sand media | | 20 g | |
| Formula 12: | | | |
| Pigment Red 179 | 33.0 | 8.6 | |
| Dispersant 5 | 7.0 | 1.8 | |
| Water | 60.0 | 15.6 | |
| Total | 100% | 26 g | 30 cps |
| Sand media | | 20 g | |
| Control 12: | | | |
| Pigment Red 179 | 33.0 | 8.6 | |
| Water | 67.0 | 17.4 | |
| Total | 100% | 26 g | Very thick |
| Sand media | | 20 g | |

EXAMPLE 10

A mixture of 233.1 g of poly(propyleneoxide/ethyleneoxide) 2-aminobenzamide D having a number average molecular weight of about 2120 (made from a primary amine-terminated poly(ethylene oxide/propylene oxide) copolymer having a number average molecular weight of about 2000), 26.8 g of dimethylsuccinyl succinate (from Sun Chemical) and 0.1 g of HCl (36.5-38% from VWR) was heated to 120° C. under nitrogen, held at that temperature for 4.5 hours. To the reaction mixture was added 9.78 g of aniline (from Aldrich) and the reaction was continued at 120° C. under nitrogen for 1.5 hours. Then reaction was heated to 180° C. under nitrogen for 3.5 hours. The resulting Dispersant 6 was an orange-red viscous liquid.

EXAMPLE 11

Water borne dispersion was prepared using pigments Red 254 (Code #226-0200 from Sun Chemical), Red 202 (Code #228-6843 from Sun Chemical), Red 122 (Code #228-0122 from Sun Chemical) or Red 179 (Code #229-6438 from Sun Chemical). All samples were mixed for 30 minutes with sand as a grinding media. The viscosity of final dispersion was measured by Brookfield DV-I+ Viscometer (with spindle #3 at 100 rpm). An identical formulations omitting the dispersant and increasing the water content to compensate were used as controls.

| | % | Amount, g | Initial Viscosity |
|---|---|---|---|
| Formula 13: | | | |
| Pigment Red 254 | 40.0 | 20.8 | |
| Dispersant 5 | 2.5 | 1.3 | |
| Water | 57.5 | 29.9 | |
| Total | 100% | 52 g | 236 cps |
| Sand media | | 40 g | |
| Control 13: | | | |
| Pigment Red 254 | 40.0 | 20.8 | |
| Water | 60 | 31.2 | |
| Total | 100% | 52 g | Very thick |
| Sand media | | 40 g | |
| Formula 14: | | | |
| Pigment Red 202 | 33.0 | 8.6 | |
| Dispersant 5 | 8.0 | 2.1 | |
| Water | 59.0 | 15.3 | |
| Total | 100% | 26 g | 46 cps |
| Sand media | | 20 g | |
| Control 14: | | | |
| Pigment Red 202 | 33.0 | 8.6 | |
| Water | 67.0 | 17.4 | |
| Total | 100% | 26 g | Very thick |
| Sand media | | 20 g | |
| Formula 15: | | | |
| Pigment Red 179 | 33.0 | 8.6 | |
| Dispersant 5 | 8.0 | 2.1 | |
| Water | 59.0 | 15.3 | |
| Total | 100% | 26 g | 67 cps |
| Sand media | | 20 g | |
| Control 15: | | | |
| Pigment Red 179 | 33.0 | 8.6 | |
| Water | 67.0 | 17.4 | |
| Total | 100% | 26 g | Very thick |
| Sand media | | 20 g | |
| Formula 16: | | | |
| Pigment Red 122 | 30.0 | 7.8 | |
| Dispersant 5 | 8.0 | 2.1 | |
| Water | 62.0 | 16.1 | |
| Total | 100% | 26 g | 155 cps |
| Sand media | | 20 g | |
| Control 16: | | | |
| Pigment Red 122 | 30.0 | 7.8 | |
| Water | 70.0 | 18.2 | |
| Total | 100% | 26 g | Very thick |
| Sand media | | 20 g | |

EXAMPLE 12

A reaction mixture containing 211.9 g of poly(propyleneoxide/ethyleneoxide) 2-aminobenzamide having a number average molecular weight of about 2120 (made from a primary amine-terminated poly(ethylene oxide/propylene oxide) copolymer having a number average molecular weight of about 2000), 13.4 g of dimethylsuccinyl succinate (from Sun Chemical) and 0.1 g of HCl (36.5-38% from VWR) was heated to 120° C. under nitrogen, held at that temperature for 6 hours. Then reaction was heated to 180° C. for 3 hours. The resulting Dispersant 7 was an orange liquid.

EXAMPLE 13

Water borne dispersion was prepared using pigments Red 202 (Code #228-6843 from Sun Chemical) or Red 179 (Code #229-6438 from Sun Chemical). All samples were mixed for 30 minutes with sand as a grinding media. The viscosity of final dispersion was measured by Brookfield DV-I+ Viscometer (with spindle #3 at 100 rpm). Identical formulations omitting the dispersant and increasing the water content to compensate were used as controls.

|  | % | Amount, g | |
|---|---|---|---|
| Formula 17: | | | |
| Pigment Red 202 | 33.0 | 8.6 | |
| Dispersant 5 | 8.0 | 2.1 | |
| Water | 59.0 | 15.3 | |
| Total | 100% | 26 g | 52 cps |
| Sand media | | 20 g | |
| Control 17: | | | |
| Pigment Red 202 | 33.0 | 8.6 | |
| Water | 67.0 | 17.4 | |
| Total | 100% | 26 g | Very thick |
| Sand media | | 20 g | |
| Formula 18: | | | |
| Pigment Red 179 | 33.0 | 8.6 | |
| Dispersant 5 | 8.0 | 2.1 | |
| Water | 59.0 | 15.3 | |
| Total | 100% | 26 g | 34 cps |
| Sand media | | 20 g | |
| Control 18: | | | |
| Pigment Red 179 | 33.0 | 8.6 | |
| Water | 67.0 | 17.4 | |
| Total | 100% | 26 g | Very thick |
| Sand media | | 20 g | |

EXAMPLE 14

A mixture of 200 g a primary amine-terminated poly(ethylene oxide/propylene oxide) copolymer having a number average molecular weight of about 2000, 60.4 g of a primary terminated poly(propylene oxide) diamine having a number average molecular weight of about 400, 53.6 g of dimethylsuccinyl succinate (from Sun Chemical) and 0.3 g of HCl (36.5-38% from VWR) was heated to 120° C. under nitrogen, held at that temperature for 9 hours. Then reaction was heated to 180° C. for 23 hours. The resulting Dispersant 8 was an dark red viscous liquid.

EXAMPLE 15

Water borne dispersion was prepared using pigments Red 254 (Code #226-0200 from Sun Chemical), Red 202 (Code #228-6843 from Sun Chemical), Red 122 (Code #228-0122 from Sun Chemical) or Red 179 (Code #229-6438 from Sun Chemical). All samples were mixed for 30 minutes with sand as a grinding media. The viscosity of final dispersion was measured by Brookfield DV-I+ Viscometer (with spindle #3 at 100 rpm). Identical formulations omitting the dispersant and increasing the water content to compensate were used as controls.

|  | % | Amount, g | Initial Viscosity |
|---|---|---|---|
| Formula 19: | | | |
| Pigment Red 254 | 40.0 | 20.8 | |
| Dispersant 5 | 2.5 | 1.3 | |
| Water | 57.5 | 29.9 | |
| Total | 100% | 52 g | 30 cps |
| Sand media | | 40 g | |
| Control 19: | | | |
| Pigment Red 254 | 40.0 | 20.8 | |
| Water | 60 | 31.2 | |
| Total | 100% | 52 g | Very thick |
| Sand media | | 40 g | |
| Formula 20: | | | |
| Pigment Red 202 | 33.0 | 8.6 | |
| Dispersant 5 | 8.0 | 2.1 | |
| Water | 59.0 | 15.3 | |
| Total | 100% | 26 g | 413 cps |
| Sand media | | 20 g | |
| Control 20: | | | |
| Pigment Red 202 | 33.0 | 8.6 | |
| Water | 67.0 | 17.4 | |
| Total | 100% | 26 g | Very thick |
| Sand media | | 20 g | |
| Formula 21: | | | |
| Pigment Red 179 | 33.0 | 8.6 | |
| Dispersant 5 | 8.0 | 2.1 | |
| Water | 59.0 | 15.3 | |
| Total | 100% | 26 g | 163 cps |
| Sand media | | 20 g | |
| Control 21: | | | |
| Pigment Red 179 | 33.0 | 8.6 | |
| Water | 67.0 | 17.4 | |
| Total | 100% | 26 g | Very thick |
| Sand media | | 20 g | |
| Formula 22: | | | |
| Pigment Red 122 | 30.0 | 7.8 | |
| Dispersant 5 | 8.0 | 2.1 | |
| Water | 62.0 | 16.1 | |
| Total | 100% | 26 g | 520 cps |
| Sand media | | 20 g | |
| Control 22: | | | |
| Pigment Red 122 | 30.0 | 7.8 | |
| Water | 70.0 | 18.2 | |
| Total | 100% | 26 g | Very thick |
| Sand media | | 20 g | |

Various changes and modifications can be made in the products and processes described above with departing from the spirit and scope of the invention. The various embodiments which have been set forth were for the purpose of illustration only and are not intended to limit the invention.

The invention claimed is:

1. A pigment dispersant which is the reaction product of a dialkylsuccinyl succinate and one or more amines of which at least one is a polymeric amine having a number average molecular weight of at least about 200.

2. The pigment dispersant of claim 1 in which the dialkylsuccinyl succinate is a di(lower alkyl)succinyl succinate and the polymeric amine is an amine-terminated poly(alkylene oxide).

3. The pigment dispersant of claim 1 in which the dialkylsuccinyl succinate is a di(lower alkyl)succinyl succinate and the polymeric amine is a aminobenzamide containing amine.

4. The pigment dispersant of claim 1 in which the dialkylsuccinyl succinate is a di(lower alkyl)succinyl succinate and the polymeric amine is an amino-N-poly(alkylene or alkyleneoxy)-benzamide containing amine.

5. The pigment dispersant of claim 1 in which the dialkylsuccinyl succinate is a di(lower alkyl)succinyl succinate and an amine is

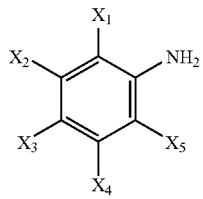

and $X_1$ through $X_5$ are individually selected from the group consisting of R', OR', COR', COOR', OCOR', carboxylate, halogen, CN, $NR'_2$, $SO_3H$, sulfonates, sulfates, NR'(COR"), CONR', $PO_3H_2$, phosphonate, N=NR', SOR', $NSO_2R'$, in which R' and R" are the same or different and independently hydrogen, hydrocarbon or polymeric and at least one is polymeric.

6. The pigment dispersant of claim 1 in which the reaction product is of the formula

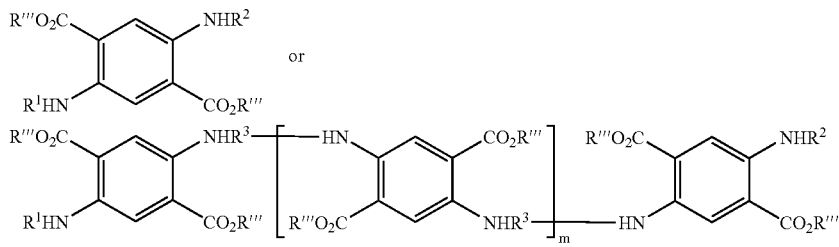

or an isomer thereof, or a mixture thereof; wherein m is 1 to 10; R''' is alkyl; $R^1$, $R^2$ and $R^3$ are the same or different aliphatic, ether, ester, ketone, amide, urea, urethane group or combination thereof; provided that at least one of $R^1$, $R^2$ and $R_3$ is polymeric.

7. The pigment dispersant of claim 6 in which R''' is lower alkyl, and at least one of $R^1$, $R^2$ and $R^3$ comprises a poly(alkyleneoxy) moiety or an amino-N-(alkylene or alkyleneoxy)-benzeneamido moiety.

8. The pigment dispersant of claim 6, wherein the dialkylsuccinyl succinate is a dimethylsuccinyl succinate and at least one of $R^1$, $R^2$ and $R^3$ is poly(alkyleneoxy)amino in which each alkyleneoxy group contains 2 or 3 carbon atoms.

9. The pigment dispersant of claim 5, wherein the dialkylsuccinyl succinate is a dimethylsuccinyl succinate and at least one of $R^1$, $R^2$ and $R^3$ is amino-N-poly(alkylene or alkyleneoxy)-benzeneamido in which each alkylene or alkyleneoxy group contains 2 or 3 carbon atoms.

10. The pigment dispersant of claim 1 in which the reaction product is of the formula

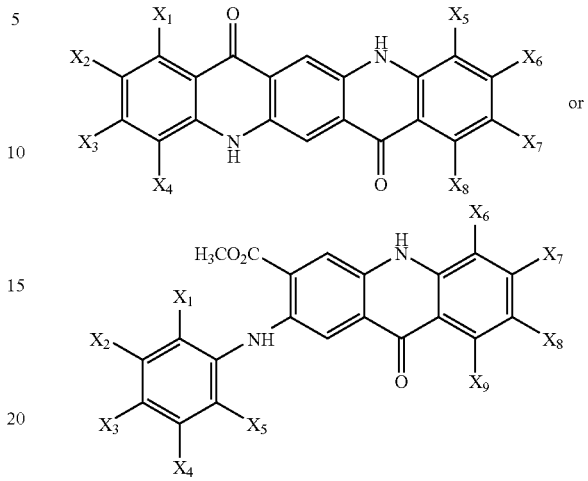

or an isomer thereof, or a mixture thereof; wherein each of $X_1$ through $X_9$ is individually selected from the group consisting of R', OR', COR', COOR', OCOR', carboxylate, halogen, CN, $NR'_2$, $SO_3H$, sulfonate, sulfate, NR'(COR"), CONR', $PO_3H_2$, phosphonate, N=NR', SOR', $NSO_2R'$, in which R' and R" are the same or different and independently hydrogen, hydrocarbon or polymeric; provided that at least one of $X_1$ through $X_9$ is polymeric.

11. A method of preparing the pigment dispersant of claim 1 which comprises reacting a dialkylsuccinyl succinate with one or more mono- or di-amine, wherein at least one amine is polymeric having a number average molecular weight of at least about 200.

12. The method of claim 11 in which at least one amine is of the formula $R-(NH_2)_n$, in which n is 1 or 2, and R is selected from the group consisting of alkyl, alkenyl, alkylene, alkenylene, alkynyl, alkynylene, aryl, arylene, oxy, amino carbonyl, carbocyclic, heterocyclic, or a combination thereof.

13. The method of claim 11 in which the dialkylsuccinyl succinate is a di(lower alkyl)succinyl succinate and in which an amine is an alkyleneoxy-containing amine, a 4-aminobenzamido-containing amine or an amine containing an aminobenzamido moiety and an alkylene or alkyleneoxy moiety.

14. The method of claim 13 in which the dialkylsuccinyl succinate is a dimethyl succinyl succinate and in which each alkylene moiety in the amine contains 2 or 3 carbon atoms.

15. The method of claim 13 in which the dialkylsuccinyl succinate is a di(lower alkyl)succinyl succinate and in which the amine is

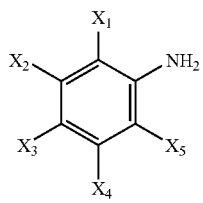

and $X_1$ through $X_6$ are individually selected from the group consisting of R', OR', COR', COOR', OCOR', carboxylate, halogen, CN, NR'$_2$, SO$_3$H, sulfonates, sulfates, NR'(COR"), CONR', PO$_3$H$_2$, phosphonate, N=NR', SOR', NSO$_2$R', in which R' and R" are the same or different and independently hydrogen, hydrocarbon or polymeric and at least one is polymeric.

16. A method of dispersing a pigment in a liquid which comprises combining together a liquid, a pigment and a dispersant of claim 1.

17. A method of dispersing a pigment in a liquid which comprises combining together a liquid, a pigment and a dispersant of claim 2.

18. A method of dispersing a pigment in a liquid which comprises combining together a liquid, a pigment and a dispersant of claim 6.

19. A method of dispersing a pigment in a liquid which comprises combining together the liquid, the pigment and a dispersant of claim 10.

20. A composition comprising the combination of a pigment with a pigment dispersant which is the reaction product of a dialkylsuccinyl succinate and one or more amines of which at least one is a polymeric amine having a number average molecular weight of at least about 200.

21. The composition of claim 20 in which the reaction product is of the formula

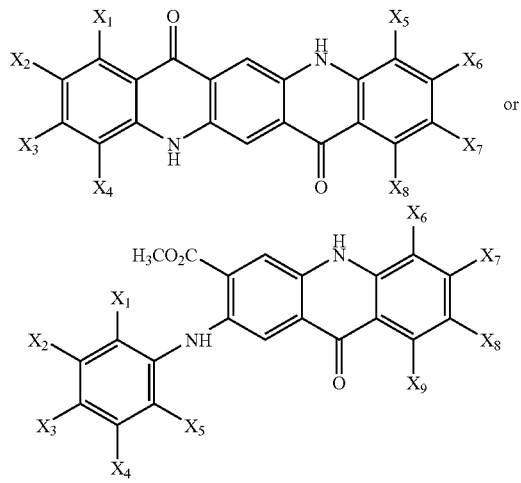

or an isomer thereof, or a mixture thereof; wherein each of $X_1$ through $X_9$ is individually selected from the group consisting of R', OR', COR'. COOR', OCOR', carboxylate, halogen. CN, NR'$_2$, SO$_3$H, sulfonate, sulfate, NR'(COR"), CONR', PO$_3$H$_2$, phosphonate, N=NR', SOR', NSO$_2$R', in which R' and R" are the same or different and independently hydrogen, hydrocarbon or polymeric; provided that at least one of $X_1$ through $X_9$ is polymeric.

22. The composition of claim 20 in which the dialkylsuccinyl succinate is a di(lower alkyl)succinyl succinate and an amine is

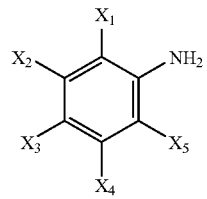

and $X_1$ through $X_5$ are individually selected from the group consisting of R', OR', COR', COOR', OCOR', carboxylate, halogen, CN, NR'$_2$, SO$_3$H, sulfonates, sulfates, NR'(COR"), CONR', PO$_3$H$_2$, phosphonate, N=NR', SOR', NSO$_2$R'. in which R' and R" are the same or different and independently hydrogen, hydrocarbon or polymeric and at least one is polymeric.

23. The composition of claim 20 in which the dialkylsuccinyl succinate is a di(lower alkyl)succinyl succinate and the polymeric amine is an amino-N-poly(alkylene or alkyleneoxy)-benzamide containing amine.

24. The composition of claim 20 in which the dialkylsuccinyl succinate is a di(lower alkyl)succinyl succinate and the polymeric amine is a aminobenzamide containing amine.

25. The composition of claim 20 in which the dialkylsuccinyl succinate is a di(lower alkyl)succinyl succinate and the polymeric amine is an amine-terminated poly(alkylene oxide).

26. A composition comprising a pigment, an ink or coating carrier and a pigment dispersant which is the reaction product of a dialkylsuccinyl succinate and one or more amines of which at least one is a polymeric amine having a number average molecular weight of at least about 200.

27. The composition of claim 26 in which the dialkylsuccinyl succinate is a di(lower alkyl)succinyl succinate and the polymeric amine is an amine-terminated poly(alkylene oxide).

28. The composition of claim 26 in which the dialkylsuccinyl succinate is a di(lower alkyl)succinyl succinate and the polymeric amine is a aminobenzamide containing amine.

29. The composition of claim 26 in which the dialkylsuccinyl succinate is a di(lower alkyl)succinyl succinate and the polymeric amine is an amino-N-poly(alkylene or alkyleneoxy)-benzamide containing amine.

30. The composition of claim 26 in which the dialkylsuccinyl succinate is a di(lower alkyl)succinyl succinate and an amine is

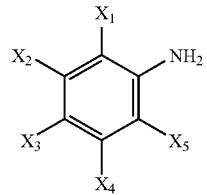

and $X_1$ through $X_5$ are individually selected from the group consisting of R', OR', COR', COOR', OCOR', carboxylate, halogen, CN, NR'$_2$, SO$_3$H, sulfonates, sulfates, NR'(COR"), CONR', PO$_3$H$_2$, phosphonate, N=NR', SOR', NSO$_2$R', in which R' and R" are the same or different and independently hydrogen, hydrocarbon or polymeric and at least one is polymeric.

31. The composition of claim 26 in which the reaction product is of the formula

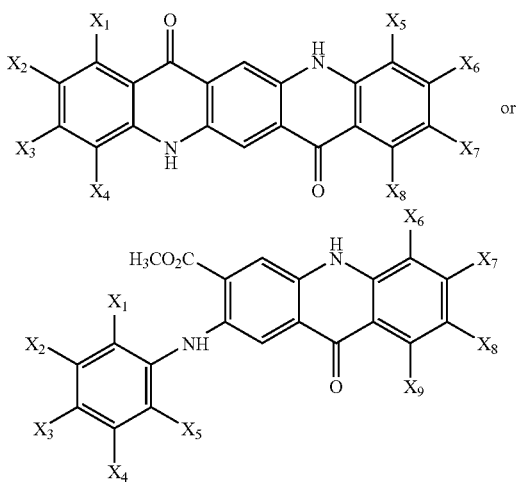

or an isomer thereof, or a mixture thereof; wherein each of $X_1$ through $X_9$ is individually selected from the group consisting of R', OR', COR', COOR', OCOR', carboxylate, halogen, CN, NR'$_2$, SO$_3$H, sulfonate, sulfate, NR'(COR''), CONR', PO$_3$H$_2$, phosphonate, N=NR', SOR', NSO$_2$R', in which R' and R'' are the same or different and independently hydrogen, hydrocarbon or polymeric; provided that at least one of $X_1$ through $X_9$ is polymeric.

32. A substrate having on at least a portion of it's surface, a composition comprising the combination of a pigment with a pigment dispersant which is the reaction product of a di(lower alkyl)succinyl succinate and one or more amines of which at least one is a polymeric amine having a number average molecular weight of at least about 200 and is an amine-terminated poly(alkylene oxide).

* * * * *